(12) United States Patent
Byun

(10) Patent No.: US 11,657,000 B2
(45) Date of Patent: May 23, 2023

(54) CONTROLLER AND MEMORY SYSTEM INCLUDING THE SAME

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 2 days.

(21) Appl. No.: 17/443,727

(22) Filed: Jul. 27, 2021

(65) Prior Publication Data

US 2022/0206953 A1   Jun. 30, 2022

(30) Foreign Application Priority Data

Dec. 30, 2020   (KR) .................. 10-2020-0188112

(51) Int. Cl.
  *G06F 12/00*   (2006.01)
  *G06F 12/1009*  (2016.01)
  *G06F 12/02*   (2006.01)

(52) U.S. Cl.
  CPC ...... *G06F 12/1009* (2013.01); *G06F 12/0253* (2013.01); *G06F 2212/657* (2013.01)

(58) Field of Classification Search
  CPC ............ G06F 12/1009; G06F 12/0253; G06F 2212/657
  See application file for complete search history.

(56) References Cited

U.S. PATENT DOCUMENTS

| 2010/0228940 A1* | 9/2010 | Asnaashari ......... G06F 12/0246 |
| | | 711/170 |
| 2016/0139817 A1* | 5/2016 | Harijono ............... G06F 3/0641 |
| | | 711/154 |
| 2020/0218465 A1* | 7/2020 | Klein .................... G06F 3/0604 |

FOREIGN PATENT DOCUMENTS

| KR | 10-2014-0094170 A | 7/2014 |
| KR | 10-2018-0008951 A | 1/2018 |
| KR | 10-2018-0012061 A | 2/2018 |

\* cited by examiner

*Primary Examiner* — Shawn X Gu
(74) *Attorney, Agent, or Firm* — IP & T Group LLP

(57) ABSTRACT

Disclosed is a memory system including: a memory device including a plurality of memory blocks; an address management component suitable for generating an address map table by sequentially mapping a logical address of write data to physical addresses of the memory blocks, in response to a write command; and a read/write control component suitable for writing the write data to a super memory block including pages of each of the memory blocks, based on the address map table, wherein the address management component maps a logical address of invalidation data which is designated by a host, to a physical address of a first memory block of the memory blocks in the address map table.

16 Claims, 6 Drawing Sheets

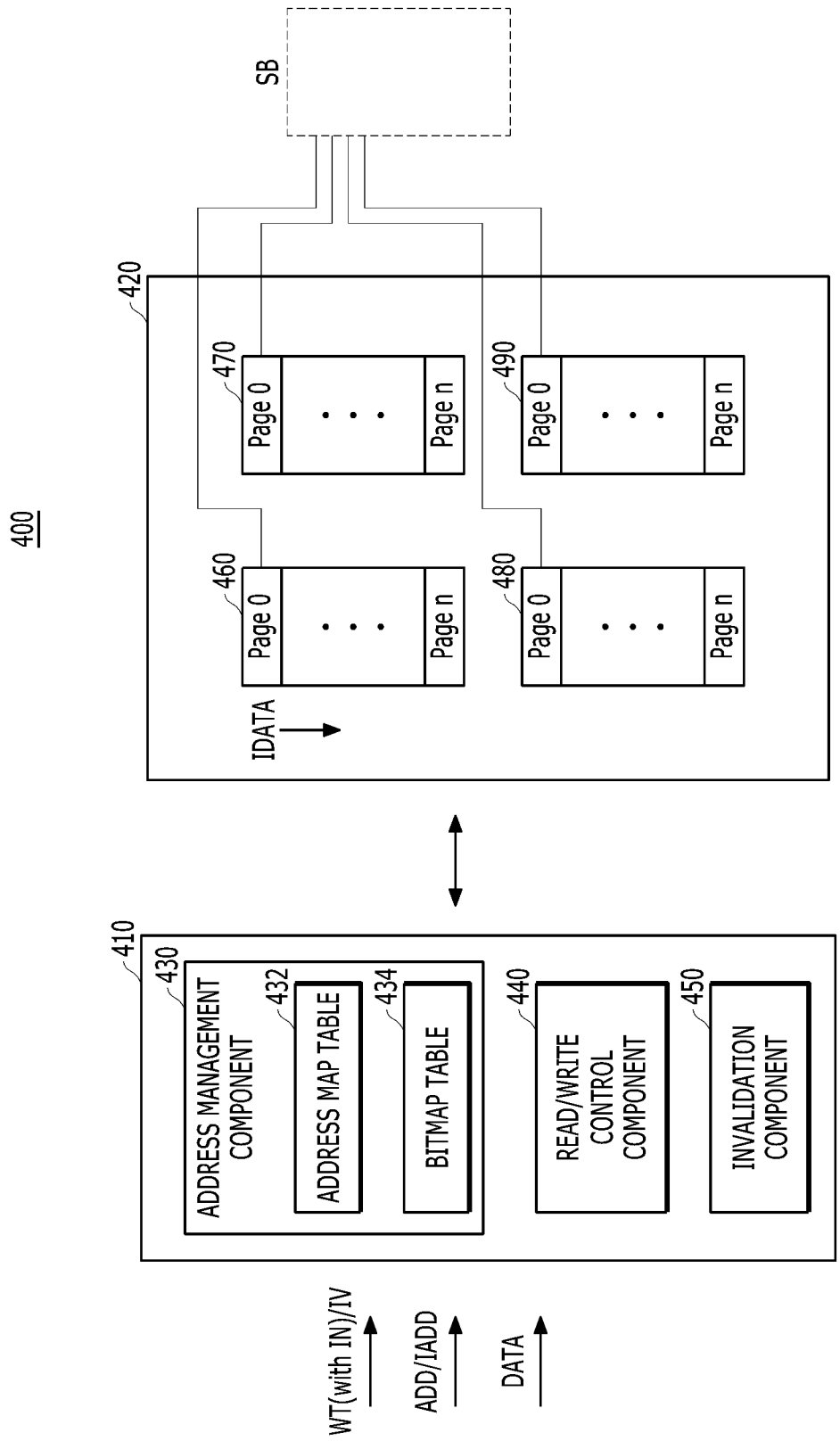

FIG. 5A

| | LBA (432a) | BA | S/R (434a) |
|---|---|---|---|
| WT → | | | |
| LBA0~LBA9 → | 0 | 0 | 0 |
| | 1 | 1 | 0 |
| | 2 | 2 | 0 |
| | 3 | 3 | 0 |
| | 4 | 0 | 0 |
| | ⋮ | ⋮ | ⋮ |
| | 9 | 1 | 0 |

FIG. 5B

| | LBA (432b) | BA | S/R (434b) |
|---|---|---|---|
| WT with IN → | | | |
| LBA0~LBA9 → | 0 | 0 | 1 |
| | 1 | 0 | 1 |
| | 2 | 0 | 1 |
| | 3 | 0 | 1 |
| | 4 | 0 | 1 |
| | ⋮ | ⋮ | ⋮ |
| | 9 | 0 | 1 |

CONTROLLER AND MEMORY SYSTEM INCLUDING THE SAME

CROSS-REFERENCE TO RELATED APPLICATION(S)

The present application claims priority under 35 U.S.C. § 119(a) to Korean Patent Application No. 10-2020-0188112, filed on Dec. 30, 2020, the disclosure of which is incorporated herein by reference in its entirety.

BACKGROUND

1. Field

Various embodiments of the present disclosure generally relate to a memory system. More particularly, the embodiments relate to a memory system that physically deletes data stored therein according to a request of a host.

2. Description of the Related Art

Recently, a paradigm for a computing environment has shifted to ubiquitous computing, which enables computer systems to be accessed anytime and everywhere. As a result, the use of portable electronic devices, such as mobile phones, digital cameras, notebook computers, and the like, are rapidly increasing. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device using a nonvolatile semiconductor memory device is advantageous in that it has excellent stability and durability because it has no mechanical driving part (e.g., a mechanical arm), and has high data access speed and low power consumption. In the context of a memory system having such advantages, examples of data storage devices include a universal serial bus (USB) memory device, a memory card having various interfaces, a solid state drive (SSD), or the like.

SUMMARY

Various embodiments of the present disclosure are directed to a memory system that may rapidly and safely delete data stored therein by controlling a storage location of data designated by a host.

In accordance with an embodiment of the present disclosure, a memory system may include: a memory device including a plurality of memory blocks; an address management component suitable for generating an address map table by sequentially mapping a logical address of write data to physical addresses of the memory blocks, in response to a write command; and a read/write control component suitable for writing the write data to a super memory block including pages of each of the memory blocks, based on the address map table, wherein the address management component maps a logical address of invalidation data which is designated by a host, to a physical address of a first memory block of the memory blocks in the address map table.

In accordance with an embodiment of the present disclosure, a memory system may include: a memory device including a plurality of memory blocks; and a controller suitable for writing write data in response to a write command, wherein the controller receives the write command, the write data and invalidation information from a host, checks the invalidation information, and writes the write data to a plurality of pages included in a first memory block of the memory blocks, when the check result indicates that the invalidation information has a first logical level.

In accordance with an embodiment of the present disclosure, a memory system may include: a memory device including a plurality of memory blocks; and a controller coupled to the memory device and configured to: receive, from a host, first write data; write the first write data to a super memory block including multiple pages, each page corresponding to each of the plurality of memory blocks; receive, from the host, second write data and invalidation information; write the second write data to a select memory block among the plurality of memory blocks; receive, from the host, address information associated with invalidation data; read, from the super memory block, the invalidation data corresponding to the address information among the first write data; and write the read invalidation data to the select memory block.

BRIEF DESCRIPTION OF THE DRAWINGS

FIG. 4 is a block diagram illustrating a memory system in accordance with an embodiment of the present disclosure.

FIGS. 5A to 5D are diagrams illustrating an operation of a controller illustrated in FIG. 4, in accordance with an embodiment of the present disclosure.

DETAILED DESCRIPTION

Various embodiments of the present disclosure are described below with reference to the accompanying drawings, in order to describe in detail the present disclosure so that those with ordinary skill in art to which the present disclosure pertains may easily carry out the technical spirit of the present disclosure. However, the present disclosure is not limited to the embodiments disclosed below, but may be implemented in various other forms. The disclosed embodiments are provided to make the present disclosure complete and to enable those skilled in the art to practice the invention.

Figure 1:
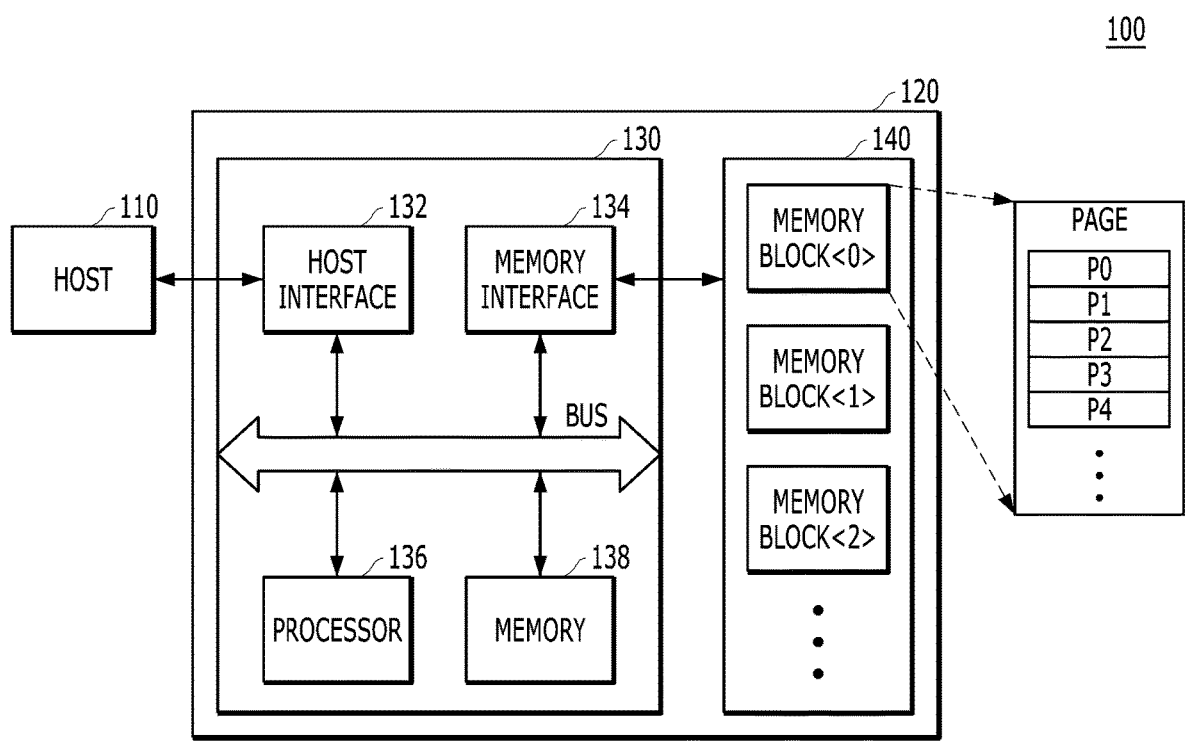
FIG. 1 is a block diagram illustrating a data processing system including a memory system in accordance with an embodiment of the present disclosure.

FIG. 1 is a block diagram illustrating a data processing system 100 including a memory system in accordance with an embodiment of the present disclosure. Referring to FIG. 1, the data processing system 100 may include a host 110 and a memory system 120.

For example, the host 110 may include any of various portable (i.e., wireless) electronic devices such as a mobile phone, MP3 player and laptop computer, or any of various non-portable electronic (i.e., wired) devices such as a desktop computer, a game machine, a television (TV) and a projector.

The host 120 also includes at least one operating system (OS), which may generally manage and control functions and operations performed in the host 110. The OS may provide interoperability between the host 110 engaged with the memory system 120 and the user needing and using the memory system 120. The OS may support functions and operations corresponding to user's requests. By the way of example but not limitation, the OS may be classified into a general operating system and a mobile operating system according to mobility of the host 110. The general operating system may be split into a personal operating system and an enterprise operating system according to system requirements or a user's environment. The personal operating system, including Windows and Chrome, may be subject to support services for general purposes. But the enterprise operating system may be specialized for securing and supporting high performance, including Windows servers, Linux, Unix and the like. Further, the mobile operating system may include Android, iOS, a Windows mobile and the like. The mobile operating system may be subject to support services or functions for mobility (e.g., a power saving function). The host 110 may include a plurality of operating systems. The host 110 may execute multiple operating systems interlocked with the memory system 120, corresponding to a user's request. The host 110 may transmit a plurality of commands corresponding to the user's requests into the memory system 120, thereby performing operations corresponding to commands within the memory system 120.

The memory system 120 may operate or perform a specific function or operation in response to a request from the host 110 and, particularly, may store data to be accessed by the host 110. The memory system 120 may be used as a main memory system or an auxiliary memory system of the host 110. The memory system 120 may be implemented with any of various types of storage devices, which may be electrically coupled with the host 110, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The memory system 120 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The storage devices for the memory system 120 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory.

Referring to FIG. 1, the memory system 120 may include a controller 130 and a memory device 140. The controller 130 may process data accessed by the host 110, and the memory device 140 may store data processed by the controller 130.

The controller 130 may control the memory device 140 in response to a request of the host 110. For example, the controller 130 may provide the host 110 with data read from the memory device 140, and store data provided from the host 110 in the memory device 140. To this end, the controller 130 may control write, read, program, erase and background operations of the memory device 140.

The controller 130 may include a host interface 132, a memory interface 134, a processor 136 and a memory 138. All of the components 132, 134, 136 and 138 included in the controller 130 may share a signal transmitted in the inside of the controller 130 through an internal bus.

The host interface 132 may interface the host 110 and the memory system 120 in response to the protocol of the host 110. The host interface 132 may perform an operation of exchanging commands and data transmitted between the host 110 and the memory system 120.

The host interface 132 may process commands and data provided from the host 110, and may communicate with the host 110 through at least one of various communication standards or interfaces such as an universal serial bus (USB), a multimedia card (MMC), a peripheral component interconnect-express (PCI-e or PCIe), a small computer system interface (SCSI), a serial-attached SCSI (SAS), a serial advanced technology attachment (SATA), a parallel advanced technology attachment (PATA), a small computer system interface (SCSI), an enhanced small disk interface (ESDI) and an integrated drive electronics (IDE). In accordance with an embodiment, the host interface 132 is a component for exchanging data with the host 110, which may be implemented through firmware called a host interface layer (HIL).

The memory interface 134 may serve as an interface for handling commands and data transferred between the controller 130 and the memory device 140, to allow the controller 130 to control the memory device 140 in response to a request delivered from the host 110. The memory interface 134 may generate a control signal for the memory device 140 and may process data entered into or outputted from the memory device 140 under the control of the processor 136 in a case when the memory device 140 is a flash memory and, in particular, when the memory device 140 is a NAND flash memory. The memory interface 134 may provide an interface for handling commands and data between the controller 130 and the memory device 140, for example, operations of NAND flash interface, in particular, operations between the controller 130 and the memory device 140. In accordance with an embodiment, the memory interface 134 may be implemented through firmware called a flash interface layer (FIL) as a component for exchanging data with the memory device 140.

The processor 136 may be implemented with a microprocessor or a central processing unit (CPU). The memory system 120 may include one or more processors 136. The processor 136 may control the overall operations of the memory system 120. By way of example but not limitation, the processor 136 may control a program operation or a read operation of the memory device 140, in response to a write request or a read request entered from the host 110. In accordance with an embodiment, the processor 136 may use or execute firmware to control the overall operations of the memory system 120. Herein, the firmware may be referred to as a flash translation layer (FTL). The FTL may perform an operation as an interface between the host 110 and the memory device 140. The host 110 may transmit requests for write and read operations to the memory device 140 through the FTL.

For example, when performing an operation requested from the host 110 in the memory device 140, the controller 130 uses the processor 136. The processor 136 engaged with the memory device 140 may handle instructions or commands corresponding to an inputted command from the host 110. The controller 130 may perform a foreground operation such as a command operation corresponding to a command inputted from the host 110, for example, a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 140 through the processor 136. By way of example but not limitation, the background operation for the memory device 140 includes a garbage collection (GC) operation, a wear leveling (WL) operation, a map flush operation and a bad block management operation of checking or searching for bad blocks.

The garbage collection operation may include an operation of copying and processing data, which are stored in a memory block among memory blocks MEMORY BLOCK<0, 1, 2, . . . > of the memory device 140, into another memory block. The wear leveling operation may include an operation of swapping and processing stored data between the memory blocks MEMORY BLOCK<0, 1, 2, . . . > of the memory device 140. The map flush operation may include an operation of storing map data, stored in the controller 130, in the memory blocks MEMORY BLOCK<0, 1, 2, . . . > of the memory device 140. The bad block management operation may include an operation of checking and processing a bad block among the memory blocks MEMORY BLOCK<0, 1, 2, . . . > of the memory device 140.

The controller 130 may generate and manage log data through the processor 136 in response to an operation of accessing the memory blocks MEMORY BLOCK<0, 1, 2, . . . > of the memory device 140. The operation of accessing the memory blocks MEMORY BLOCK<0, 1, 2, . . . > of the memory device 140 may include a foreground operation or a background operation performed on the memory blocks MEMORY BLOCK<0, 1, 2, . . . > of the memory device 140.

The memory 138, which is a working memory of the memory system 120 and the controller 130, may store data for driving the memory system 120 and the controller 130. More specifically, when the controller 130 controls the memory device 140 in response to a request of the host 110, the memory 138 may store firmware driven by the processor 136 and data required for driving the firmware, for example, metadata.

In addition, the memory 138, which is a buffer memory of the memory system 120 and the controller 130, may temporarily store write data transmitted from the host 110 to the memory device 140 and read data transmitted from the memory device 140 to the host 110. The memory 138 may include a program memory, a data memory, a write buffer/cache, a read buffer/cache, a data buffer/cache and a map buffer/cache, for storing the write and read data.

The memory 138 may be implemented with a volatile memory. The memory 138 may be implemented with a static random access memory (SRAM), a dynamic random access memory (DRAM) or both.

Although FIG. 1 illustrates that the memory 138 is included in the controller 130, the present disclosure is not limited thereto. In an implementation, the memory 138 may be included outside the controller 130, and the controller 130 may input and output data to the memory 138 through a separate memory interface (not illustrated).

The memory device 140 may operate as a storage medium of the memory system 120.

The memory device 140 may be a nonvolatile memory device and may retain data stored therein even while an electrical power is not supplied. The memory device 140 may store data provided from the host 110 through a write operation, and provide data stored therein to the host 110 through a read operation.

In an embodiment of the disclosure, the memory device 140 is embodied as a nonvolatile memory such as a flash memory for example a NAND flash memory, a NOR flash memory and the like. Alternatively, the memory device 140 may be implemented by at least one of a phase change random access memory (PCRAM), a ferroelectrics random access memory (FRAM) and a spin transfer torque magnetic random access memory (SU-RAM or STT-MRAM).

The memory device 140 may include the plurality of memory blocks MEMORY BLOCK<0, 1, 2, . . . >. Each of the memory blocks MEMORY BLOCK<0, 1, 2, . . . > may include a plurality of pages P<0, 1, 2, 3, 4, . . . >. Furthermore, although not specifically illustrated in the drawings, each of the pages P<0, 1, 2, 3, 4, . . . > may include a plurality of memory cells.

Each of the memory blocks MEMORY BLOCK<0, 1, 2, . . . > included in the memory device 140 may be classified into a single-level cell (SLC) memory block and a multi-level cell (MLC) memory block depending on the number of bits that can be stored or represented in a single memory cell included therein.

The memory device 140 may include a plurality of memory blocks. The plurality of memory blocks may be any of different types of memory blocks such as a single-level cell (SLC) memory block, a multi-level cell (MLC) memory block or the like, according to the number of bits that can be stored or represented in one memory cell. Here, the SLC memory block includes a plurality of pages implemented by memory cells, each storing one bit of data. The SLC memory block may have high data I/O operation performance and high durability. The MLC memory block includes a plurality of pages implemented by memory cells, each storing multi-bit data (e.g., two bits or more). The MLC memory block may have larger storage capacity for the same space compared to the SLC memory block. The MLC memory block may be highly integrated in a view of storage capacity. In an embodiment, the memory device 140 may be implemented with MLC memory blocks such as an MLC memory block, a triple-level cell (TLC) memory block, a quadruple-level cell (QLC) memory block and a combination thereof. The MLC memory block may include a plurality of pages implemented by memory cells, each capable of storing 2-bit data. The triple-level cell (TLC) memory block may include a plurality of pages implemented by memory cells, each capable of storing 3-bit data. The quadruple-level cell (QLC) memory block may include a plurality of pages implemented by memory cells, each capable of storing 4-bit data. In another embodiment, the memory device 140 may be implemented with a block including a plurality of pages implemented by memory cells, each capable of storing 5-bit or more bit data.

According to the present embodiment, the controller 130 may store data in a plurality of memory blocks MEMORY BLOCK<0, 1, 2, . . . > in an interleaving method, through the processor 136. That is, the controller 130 may write data to a super memory block including pages of each of the memory blocks MEMORY BLOCK<0, 1, 2, . . . >, for example, first pages P<0>. While writing the data to the super memory block, the controller 130 may store specific data requested by the host 110 in one of the memory blocks MEMORY BLOCK<0, 1, 2, . . . >, for example, pages P<0, 1, 2, 3, 4, . . . > included in the first memory block MEMORY BLOCK<0>. Hereinafter, operations of the controller 130 and memory device 140 are described in more detail.

Figure 2:
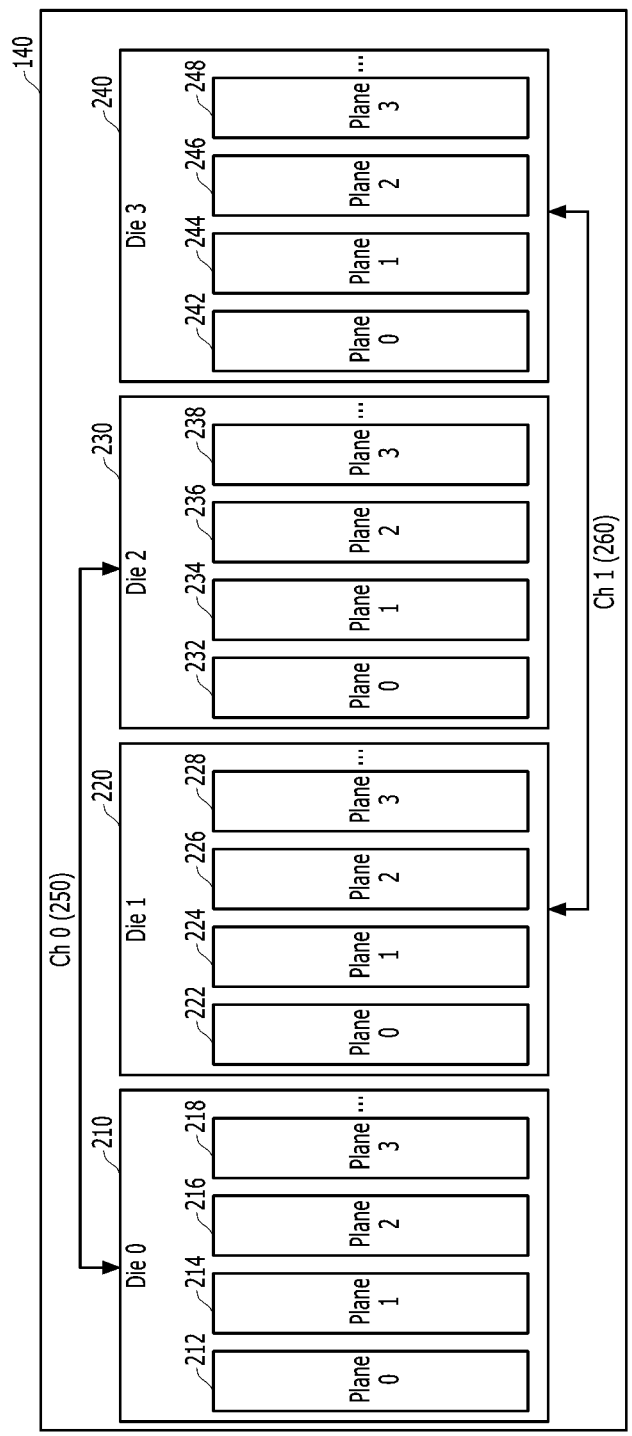
FIG. 2 is a diagram illustrating a memory device illustrated in FIG. 1, in accordance with an embodiment of the present disclosure.

FIG. 2 is a diagram illustrating the memory device 140 illustrated in FIG. 1, in accordance with an embodiment of the present disclosure.

Referring to FIG. 2, the memory device 140 may include a plurality of memory dies, for example, a zeroth memory die 210, a first memory die 220, a second memory die 230 and a third memory die 240. Each of the memory dies 210, 220, 230 and 240 may include a plurality of planes.

That is, the zeroth memory die (Die 0) 210 may include a zeroth plane 212, a first plane 214, a second plane 216 and a third plane 218. The first memory die (Die 1) 220 may include a zeroth plane 222, a first plane 224, a second plane 226 and a third plane 228. The second memory die (Die 2) 230 may include a zeroth plane 232, a first plane 234, a second plane 236 and a third plane 238. The third memory die (Die 3) 240 may include a zeroth plane 242, a first plane 244, a second plane 246 and a third plane 248.

Each of the planes 212, 214, 216, 218, 222, 224, 226, 228, 232, 234, 236, 238, 242, 244, 246 and 248 included in the memory dies 210, 220, 230 and 240 may include a plurality of memory blocks. The memory blocks may correspond to the memory blocks MEMORY BLOCK<0, 1, 2, . . . > each including the plurality of pages P<0, 1, 2, 3, 4, . . . > illustrated in FIG. 1.

The plurality of memory dies 210, 220, 230 and 240 of the memory device 140 may be coupled through one or more channels. For example, the zeroth memory die 210 and the second memory die 230 may be coupled to a zeroth channel (Ch 0) 250, and the first memory die 220 and the third memory die 240 may be coupled to a first channel (Ch 1) 260.

In an embodiment, the plurality of memory blocks included in the memory device 140 may be grouped into super memory blocks, and subsequently, data corresponding to a write command received from the host 110 may be written and stored into the super memory blocks through a one-shot program. In this case, each of the super memory blocks may include memory blocks included in memory dies coupled to different channels or memory blocks included in different memory dies.

For example, the super memory block may include a first memory block included in the zeroth memory die 210 coupled to the zeroth channel 250, a second memory block included in the first memory die 220 coupled to the first channel 260, a third memory block included in the second memory die 230 coupled to the zeroth channel 250 and a fourth memory block included in the third memory die 240 coupled to the first channel 260. In an embodiment, although it is described as an example that one super memory block includes four memory blocks, the super memory block may include just two memory blocks, for example, the first memory block included in the zeroth memory die 210 coupled to the zeroth channel 250 and the second memory block included in the first memory die 220 coupled to the first channel 260.

That is, the memory device 140 may perform a program operation on the super memory block through a channel interleaving method, a memory die interleaving method or a memory chip interleaving method. To this end, the memory blocks included in the super memory block may include memory blocks included in different memory dies or memory blocks of different memory dies coupled to different channels.

As described above, when the super memory block includes four memory blocks in four memory dies coupled to two channels, the program operation may be performed through the channel interleaving method and the memory die interleaving method. To this end, a first page of a first super memory block may correspond to a first page of a first memory block, and a second page of the first super memory block, which is subsequent to the first page of the first super memory block, may correspond to a first page of a second memory block. Subsequently, a third page of the first super memory block, which is subsequent to the second page of the first super memory block, may correspond to a first page of a third memory block, and a fourth page of the first super memory block, which is subsequent to the third page of the first super memory block may correspond to a first page of a fourth memory block.

Figure 3:
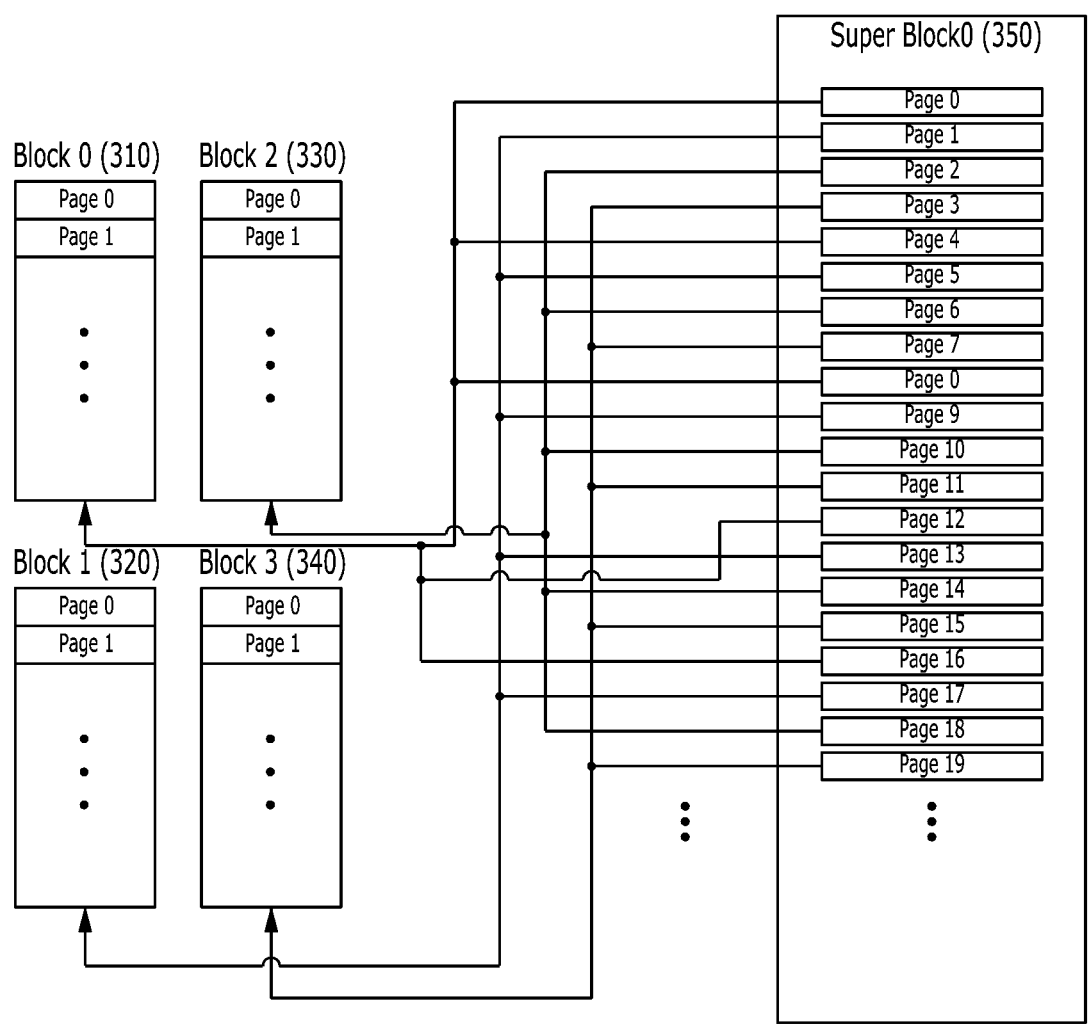
FIG. 3 is a diagram illustrating a program operation of the memory device illustrated in FIG. 2, in accordance with an embodiment of the present disclosure.

Hereinafter, the program operation performed on super memory blocks included in the memory device 140 is described in more detail through an example with reference to FIG. 3. The memory device 140 may include a plurality of super memory blocks. Referring to FIG. 3, one of the super memory blocks, for example, a zeroth super memory block (Super Block0) 350, may include a zeroth memory block 310 included in the zeroth memory die 210, a first memory block 320 included in the first memory die 220, a second memory block 330 included in the second memory die 230 and a third memory block 340 included in the third memory die 240.

By way of example, it is described that the zeroth memory die 210 and second memory die 230 coupled to the zeroth channel 250 are memory dies of different ways, and the first memory die 220 and third memory die 240 coupled to the first channel 260 are memory dies of different ways. That is, the zeroth memory die 210 may be a memory die of a zeroth way in the zeroth channel 250, and the second memory die 230 may be a memory die of a first way in the zeroth channel 250. Similarly, the first memory die 220 may be a memory die of a zeroth way in the first channel 260, and the third memory die 240 may be a memory die of a first way in the first channel 260.

Although FIG. 3 illustrates that the zeroth super memory block 350 includes four memory blocks, the present disclosure is not limited thereto. When the zeroth super memory block 350 includes only two memory blocks, the zeroth super memory block 350 may include the zeroth memory block 310 included in the zeroth memory die 210 and the first memory block 320 included in the first memory die 220, or the second memory block 330 included in the second memory die 230 and the third memory block 340 included in the third memory die 240.

The controller 130 may perform the program operation, which corresponds to the write command received from the host 110, on the zeroth super memory block 350 included in the memory device 140. The controller 130 may write and store data, which corresponds to the write command, into a plurality of pages included in the zeroth super memory block 350. Particularly, the controller 130 may sequentially write the data, starting from a zeroth page, which is the first page among the plurality of pages included in the zeroth super memory block 350.

As the zeroth super memory block 350 includes the zeroth memory block 310, the first memory block 320, the second memory block 330 and the third memory block 340, a plurality of pages included in the zeroth memory block 310, the first memory block 320, the second memory block 330 and the third memory block 340 may sequentially correspond to the plurality of pages included in the zeroth super memory block 350, through the channel interleaving method and the memory die interleaving method.

For example, a zeroth page (Page 0) of the zeroth memory block 310 may be a zeroth page (Page 0) of the zeroth super memory block 350, a zeroth page (Page 0) of the first memory block 320 may be a first page (Page 1) of the zeroth super memory block 350, a zeroth page (Page 0) of the second memory block 330 may be a second page (Page 2) of the zeroth super memory block 350, and a zeroth page (Page 0) of the third memory block 340 may be a third page (Page 3) of the zeroth super memory block 350. In addition, a first page (Page 1) of the zeroth memory block 310 may be a fourth page (Page 4) of the zeroth super memory block 350, a first page (Page 1) of the first memory block 320 may be a fifth page (Page 5) of the zeroth super memory block 350, a first page (Page 1) of the second memory block 330 may be a sixth page (Page 6) of the zeroth super memory block 350, and a first page (Page 1) of the third memory block 340 may be a seventh page (Page 7) of the zeroth super memory block 350.

As the controller 130 sequentially performs the program operation, starting from the zeroth page of the zeroth super memory block 350, data may be sequentially written and stored into the zeroth pages of the zeroth memory block 310, the first memory block 320, the second memory block 330 and the third memory block 340. Subsequently, data may be sequentially written and stored into the first pages of the zeroth memory block 310, the first memory block 320, the second memory block 330 and the third memory block 340.

That is, as the controller 130 writes data to the zeroth super memory block 350 including the plurality of memory blocks 310, 320, 330 and 340, the write operation may be performed in parallel on each of the memory blocks 310, 320, 330 and 340. In other words, respective write operation periods of the memory blocks 310, 320, 330 and 340 may overlap, and thus, overall program operation time of the memory device 140 may be reduced.

When data stored in the zeroth super memory block 350, that is, the plurality of memory blocks 310, 320, 330 and 340, are deleted, it may take a long time. Since the memory device 140 performs the erase operation in units of memory blocks, a garbage collection operation needs to be performed on each of the memory blocks 310, 320, 330 and 340 in order to delete the data stored in the plurality of memory blocks 310, 320, 330 and 340. Particularly, since the memory device 140 can retain stored data even when power is cut off, the controller 130 needs to physically delete the data, stored in the memory device 140, according to the request of the host 110. In this case, time required for the data erase operation requested by the host 110 or a load of the controller 130 may increase.

FIG. 4 is a block diagram illustrating a memory system 400 in accordance with an embodiment of the present disclosure. Referring to FIG. 4, the memory system 400 may include a controller 410 and a memory device 420.

The controller 410 may write write data DATA to the memory device 420 in response to a write command WT. As described above, the memory device 420 may include a plurality of memory blocks, for example, first to fourth memory blocks 460, 470, 480 and 490. The controller 410 may write the write data DATA to a super memory block SB including pages of each of the first to fourth memory blocks 460, 470, 480 and 490.

As illustrated in FIG. 4, the super memory block SB may include zeroth pages of the first to fourth memory blocks 460, 470, 480 and 490. In addition, as described above, the super memory block SB may sequentially include the zeroth pages to $n^{th}$ pages of the first to fourth memory blocks 460, 470, 480 and 490, and the write data DATA may be sequentially written to the zeroth pages to $n^{th}$ pages of the first to fourth memory blocks 460, 470, 480 and 490.

According to an embodiment, the controller 410 may store specific data requested by a host (not illustrated) in one of the first to fourth memory blocks 460, 470, 480 and 490 of the memory device 420. For example, the controller 410 may store invalidation data IDATA, requested by the host, in the zeroth page to $n^{th}$ page included in the first memory block 460.

As described above, the memory device 420 as a nonvolatile memory may retain stored data even when power is cut off. Accordingly, among data stored in the memory device 420, high security data such as personal information or key information used for encryption needs to be safely deleted. The invalidation data IDATA may include such high security data.

In some embodiments, the invalidation data IDATA may be designated by the host. The controller 410 may manage the invalidation data IDATA, which is designated by the host, differently from general data. In addition, when an invalidation request is received from the host, the controller 410 may physically delete the invalidation data IDATA. The invalidation request may include a fast deletion request or a secure deletion request. The controller 410 may physically delete the invalidation data IDATA by performing a garbage collection operation and an erase operation.

The invalidation data IDATA may be designated by the host in various ways. Hereinafter, an operation of managing and deleting the invalidation data IDATA by the controller 410 according to the various ways in which the invalidation data IDATA is designated is described in more detail.

According to an embodiment, the controller 410 may receive invalidation information IN, indicating the invalidation data IDATA, together with the write command WT. In this case, the controller 410 may write the write data DATA to the zeroth page to $n^{th}$ page (Page 0 to Page n) of the first memory block 460 instead of the super memory block SB. In some embodiments, the invalidation information IN may include flag information, and have different logic levels depending on whether the write data DATA is the invalidation data IDATA.

For example, when the invalidation information IN has a second logical level, the write data DATA is not the invalidation data IDATA, and the controller 410 may write the write data DATA to pages of the super memory block SB. On the other hand, when the invalidation information IN has a first logic level different from the second logic level, the write data DATA is the invalidation data IDATA, and the controller 410 may write the write data DATA to the plurality of pages of the first memory block 460.

According to another embodiment, the controller 410 may receive a first address IADD associated with the invalidation data IDATA. The controller 410 may check the invalidation data IDATA, which is previously stored in the super memory block SB, based on the first address IADD. Alternatively, the controller 410 may check whether the write data DATA inputted according to the write command WT is the invalidation data IDATA, based on the first address IADD.

In other words, when the first address IADD associated with the invalidation data IDATA is received, the controller 410 may read data corresponding to the first address IADDD among the data written to the super memory block SB. In addition, the controller 410 may write the read data back to the zeroth page to $n^{th}$ page of the first memory block 460.

Furthermore, the controller 410 may store or separately manage the first address IADD by setting a bit corresponding to the first address IADD by using an address map table. During a normal write operation, when an address ADD is received together with the write command WT, the controller 410 may compare the received address ADD with the first address IADD. When the comparison result indicates that the address ADD received together with the write command WT is different from the first address IADD, the controller 410 may write the write data DATA, inputted according to the write command WT, to the pages of the super memory block SB. On the other hand, when the comparison result indicates that the address ADD received together with the write command WT coincides with the first address IADD, the controller 410 may write the write data DATA, inputted according to the write command WT, to the zeroth page to $n^{th}$ page of the first memory block 460 instead of the super memory block SB.

According to an embodiment, the controller 410 may receive an invalidation command IV from the host. In response to the invalidation command IV, the controller 410 may delete the invalidation data IDATA stored in the first memory block 460. The controller 410 may perform the garbage collection operation on the first memory block 460.

Through the garbage collection operation, the controller 410 may check valid data stored in the first memory block 460. The controller 410 may read data except for the invalidation data IDATA among the checked valid data, and write the read data to a target memory block included in the memory device 420, that is, a memory block other than the first memory block 460. The controller 410 may perform the erase operation on the first memory block 460 on which the garbage collection operation has been performed.

Referring to FIG. 4, the controller 410 may include an address management component 430, a read/write control component 440 and an invalidation component 450. The controller 410 may include various functional modules through hardware such as a control circuit and/or software including a program. For example, the controller 410 may implement the configuration of the address management component 430, the read/write control component 440 and the invalidation component 450 by using firmware such as a flash translation layer (FTL).

The address management component 430 may generate and manage an address map table 432 and a bitmap table 434. The address management component 430 may sequentially map the address ADD corresponding to the write data DATA, that is, a logical address, to physical addresses of the first to fourth memory blocks 460, 470, 480 and 490, and generate the address map table 432. In this case, the address management component 430 may map the logical address of the invalidation data IDATA to the physical address of the first memory block 460 in the address map table 432. The address management component 430 may generate the bitmap table 434. The bitmap table 434 may include a plurality of bits corresponding to a plurality of logical addresses and may be generated by setting a bit corresponding to the logical address of the invalidation data IDATA.

Although FIG. 4 illustrates as an example that the address management component 430 separately generates the bitmap table 434, the present disclosure is not limited thereto. The address management component 430 may generate the address map table 432 by mapping the logical addresses of the write data DATA and invalidation data IDATA to the physical addresses, and represent whether the corresponding data is the invalidation data IDATA, by setting bits corresponding to the logical addresses mapped in the address map table 432.

The read/write control component 440 may control the invalidation data IDATA to be stored in the first memory block 460 while writing the write data DATA to the super memory block SB based on the address map table 432. In response to the invalidation command IV, the invalidation component 450 may delete the invalidation data IDATA stored in the first memory block 460, based on the bitmap table 434. Hereinafter, operations of the controller 410 and the address management component 430, the read/write control component 440 and the invalidation component 450 included in the controller 410 are described in more detail with reference to FIGS. 5A to 5D.

FIGS. 5A to 5D are diagrams illustrating an operation of the controller 410 illustrated in FIG. 4, in accordance with an embodiment of the present disclosure. FIGS. 5A to 5D illustrate the address map table 432 and the bitmap table 434 generated and managed by the address management component 430 of FIG. 4.

FIG. 5A represents a normal write operation performed by the controller 410. The write operation performed on write data corresponding to ten logical addresses LBA0 to LBA9 together with the write command WT is presented as an example. In response to the write command WT, the address management component 430 may sequentially map the logical addresses LBA0 to LBA9 to physical addresses BA0 to BA3 of the first to fourth memory blocks 460, 470, 480 and 490, and generate an address map table 432a.

In other words, four logical addresses LBA0 to LBA3 may be sequentially mapped corresponding to the physical addresses BA0 to BA3 of the first to fourth memory blocks 460, 470, 480 and 490, and four logical addresses LBA4 to LBA7 may be continuously and repeatedly mapped to the physical addresses BA0 to BA3. Accordingly, the last logical address LBA9 may be mapped to the physical address BA1 of the second memory block 470. At this time, the address management component 430 may maintain the bits, which correspond to the logical addresses LBA0 to LBA9, in a reset state, that is, at a first logical level "0" (S/R is 0), in a bit map table 434a.

Accordingly, the read/write control component 440 may sequentially write the write data, which corresponds to the logical addresses LBA0 to LBA9, to the first to fourth memory blocks 460, 470, 480 and 490 based on the address map table 432a. That is, the read/write control component 440 may write the write data to the super memory block SB including the pages of each of the first to fourth memory blocks 460, 470, 480 and 490.

Although the address map table 432a of FIG. 5A illustrates mapping relationships between the logical addresses LBA0 to LBA9 of the write data and the physical addresses BA0 to BA3 of the first to fourth memory blocks 460, 470, 480 and 490, the present disclosure is not limited thereto.

For example, the address map table 432a may include mapping relationships between the logical addresses LBA0 to LBA9 of the write data and physical addresses of the corresponding memory blocks and pages.

According to an embodiment, the address management component 430 may map a logical address of invalidation data, designated by the host, to one of the first to fourth memory blocks 460, 470, 480 and 490, for example, the physical address BA0 of the first memory block 460, in the address map table 432a. In addition, the address management component 430 may set a bit corresponding to the logical address of the invalidation data in the bitmap table 434a.

FIG. 5B represents the write operation performed on invalidation data by the controller 410. That is, the invalidation information IN indicating that the write data is the invalidation data may be received together with the write command WT from the host. The address management component 430 may check the invalidation information IN, and map the logical addresses LBA0 to LBA9 of the write data to the physical address BA0 of the first memory block 460 and generate an address map table 432b when the invalidation information IN has the first logical level. In addition, the address management component 430 may represent that the write data is the invalidation data, by setting bits corresponding to the logical addresses LBA0 to LBA9 to a set state, that is, a second logical level "1" (S/R is 1), in a bitmap table 434b.

Accordingly, the read/write control component 440 may write the write data, which corresponds to the logical addresses LBA0 to LBA9, to the plurality of pages corresponding to the physical address BA0 of the first memory block 460 based on the address map table 432b. That is, the controller 410 may write the write data to the first memory block 460 based on the invalidation information IN for the invalidation data received together with the write command WT.

Figure 5C:
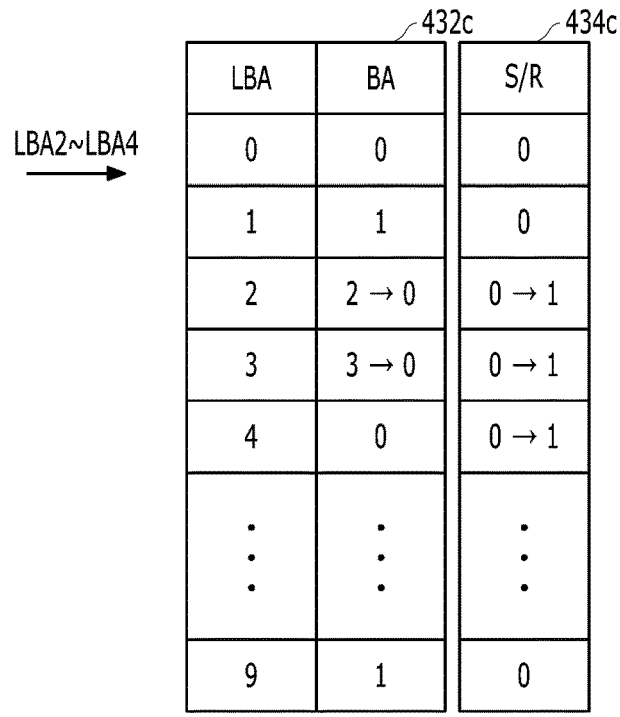
Figure 5D:
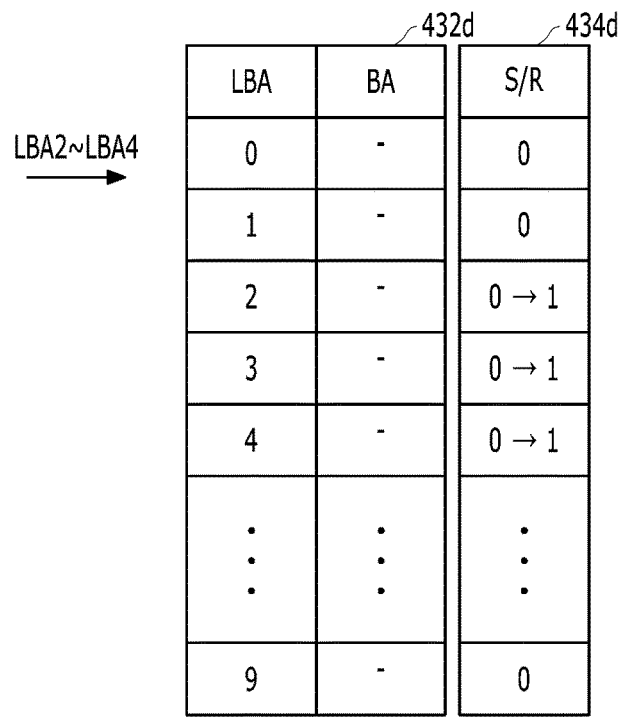

According to another embodiment, the controller 410 may receive an address corresponding to the invalidation data from the host, regardless of the write operation. FIGS. 5C and 5D represent as an example that the logical addresses LBA2 to LBA4 are received as addresses corresponding to the invalidation data.

FIG. 5C represents a case in which data corresponding to the logical addresses LBA2 to LBA4 are already stored in the memory device 420 according to the write operation illustrated in FIG. 5A. Referring to an address map table 432c, it may be seen that the logical addresses LBA2 to LBA4 are mapped to physical addresses BA2, BA3 and BA0 of the third, fourth and first memory blocks 480, 490 and 460, respectively.

In this case, the address management component 430 may check whether the logical addresses LBA2 to LBA4 are mapped, and update the address map table 432c. The address management component 430 may remap the logical addresses LBA2 and LBA3, which are mapped with the physical addresses BA2 and BA3 of the memory blocks 480 and 490 other than the first memory block 460 among the logical addresses LBA2 to LBA4, to the logical address BA0 of the first memory block 460. In addition, the address management component 430 may set bits corresponding to the logical addresses LBA2 to LBA4 to a set state, that is, to a second logical level "1" (S/R is 1) in a bit map table 434c.

Accordingly, the read/write control component 440 may read write data corresponding to the logical addresses LBA2 and LBA3 from the memory blocks 480 and 490 based on the updated address map table 432b, and write the read data to the plurality of pages of the first memory block 460 again. That is, the controller 410 may read the invalidation data, which is previously stored in the super memory block SB, based on an address corresponding to the invalidation data, and write the read invalidation data to the first memory block 460 again.

FIG. 5D represents a case in which data corresponding to the logical addresses LBA2 to LBA4 are not stored in the memory device 420. Referring to an address map table 432d, it may be seen that a mapping relationship between the logical addresses LBA2 to LBA4 is in an unmapped state. Accordingly, the address management component 430 may set bits corresponding to the logical addresses LBA2 to LBA4 to a set state, that is, to a second logical level "1" (S/R is 1) in a bit map table 434d.

Thereafter, during the normal write operation, the address management component 430 may compare the logical address of the write data with the logical addresses LBA2 to LBA4 in which the corresponding bits are in the set state in the bit map table 434d. When the comparison result indicates that the logical address of the write data coincides with the logical addresses LBA2 to LBA4, the address management component 430 may map the logical address of the write data to the physical address BA0 of the first memory block 460.

Referring to FIG. 5D, during an invalidation operation, the invalidation component 450 may delete the data having the logical addresses LBA2 to LBA4 in which the corresponding bits are in the set state in the bit map table 434d. In response to the invalidation command IV, the invalidation component 450 may perform the garbage collection operation on the first memory block 460, and check valid data. The invalidation component 450 may read data except for the data having the logical addresses LBA2 to LBA4 among the checked valid data, write the read data to the target memory block included in the memory device 420, that is, a memory block other than the first memory block 460, and delete the data stored in the first memory block 460.

Through this operation, the host may transmit the address corresponding to the invalidation data to the memory system 400 in advance, and does not need to transmit additional information during the write operation. The controller 410 of the memory system 400 may compare the address corresponding to the invalidation data with the address of the write data, and store the invalidation data of the write data in one memory block, not a super memory block.

In addition, the controller 410 may also read the invalidation data previously stored in the super memory block SB, and write the invalidation data back to the memory block 460. Accordingly, during the invalidation operation, the controller 410 may rapidly delete the invalidation data by performing the garbage collection operation on only the memory block 460, not the super memory block SB.

Although not illustrated in FIG. 4, the controller 410 may manage information indicating whether the zeroth pages to $n^{th}$ pages of each of the memory blocks 460, 470, 480 and 490 are valid or whether stored data is valid, by using a bitmap table. During the garbage collection operation, the controller 410 may check the valid data stored in the memory blocks 460, 470, 480 and 490, based on the bitmap table. In addition, during the write operation, the controller 410 may sequentially check the corresponding pages of the super memory block SB or the first memory block 460 based on the bitmap table, and thus write the data DATA or the invalidation data IDATA to valid pages.

According to an embodiment of the present disclosure, the memory system may reduce program operation time by storing data in a plurality of memory blocks in an interleaved method, and also reduce time required to delete the stored data. That is, the controller included in the memory system may control designated data to be stored in one memory block rather than the plurality of memory blocks to physically, safely and immediately delete the designated data at a request of deleting the designated data. To this end, the memory system may receive information or an address for the designated data, and check and manage the designated data of input data or stored data in various ways based on the information or address.

The methods, processes, and/or operations described herein may be performed by code or instructions to be executed by a computer, processor, controller, or other signal processing device. The computer, processor, controller, or other signal processing device may be those herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

When implemented in at least partially in software, the controllers, processors, managers, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

While the present disclosure has been specifically described with reference to the embodiments, it should be noted that the disclosed embodiments are provided for illustrative purposes, not restrictive purposes. The embodiments may be combined to form additional embodiments. Further, those skilled in the art will understand that various embodiments are possible through various substitutions, changes, and modifications without departing from the scope of the present disclosure and the following claims.

What is claimed is:

1. A memory system comprising:
a memory device including a plurality of memory blocks;
an address management component suitable for generating an address map table by sequentially mapping a logical address of write data to physical addresses of the memory blocks, in response to a write command; and
a read/write control component suitable for writing the write data to a super memory block including pages of each of the memory blocks, based on the address map table,
wherein the address management component maps a logical address of invalidation data which is designated by a host, to a physical address of a first memory block of the memory blocks in the address map table,
wherein the address management component receives a first logical address associated with the invalidation data from the host, and updates the address map table by checking whether the first logical address is mapped, and
wherein when the first logical address is mapped to a physical address of a memory block other than the first memory block among the plurality of memory blocks in the address map table, the address management component remaps the first logical address to a physical address of the first memory block, and sets a bit corresponding to the first logical address.

2. The memory system of claim 1, wherein the address management component receives invalidation information together with the write command from the host, checks the invalidation information, and generates the address map table by mapping the logical address of the write data to the physical address of the first memory block when a check result indicates that the invalidation information has a first logic level.

3. The memory system of claim 2, wherein the address management component sets a bit corresponding to the logical address of the write data in the address map table, which indicates that the write data is the invalidation data.

4. The memory system of claim 2, wherein the read/write control component writes the write data to a plurality of pages of the first memory block, instead of the super memory block, based on the address map table.

5. The memory system of claim 1, wherein the read/write control component reads data which corresponds to the first logical address, from the super memory block based on the updated address map table, and writes the read data to a plurality of pages of the first memory block.

6. The memory system of claim 1, wherein when the first logical address is unmapped with the physical address in the address map table, the address management component sets a bit corresponding to the first logical address.

7. The memory system of claim 6, wherein the address management component compares the logical address of the write data with the first logical address.

8. The memory system of claim 7, wherein when a comparison result indicates that the logical address of the write data coincides with the first logical address, the address management component maps the logical address of the write data to the physical address of the first memory block.

9. The memory system of claim 1, further comprising an invalidation component suitable for deleting the invalidation data based on the address map table, in response to an invalidation command.

10. The memory system of claim 9, wherein the invalidation component performs a garbage collection operation by reading data except for data having a logical address in which a corresponding bit is set in the address map table, among valid data stored in the first memory block, and writing the read data to a plurality of pages included in a second memory block, which is different from the first memory block, among the plurality of memory blocks.

11. The memory system of claim 10, wherein the invalidation component performs an erase operation on the first memory block on which the garbage collection operation is performed.

12. A memory system comprising:

a memory device including a plurality of memory blocks; and a controller suitable for writing write data in response to a write command, wherein the controller receives the write command, the write data and invalidation information from a host, checks the invalidation information, and writes the write data to a plurality of pages included in a first memory block of the memory blocks, when a check result indicates that the invalidation information has a first logical level, wherein the controller receives a first logical address associated with invalidation data from the host, reads data corresponding to the first logical address among the data written to a super memory block, and writes the read data to the plurality of pages included in the first memory block, and wherein the controller receives the write command, the write data and a second logical address from the host, compares the first logical address with the second logical address, and writes the write data to the super memory block and the first memory block based on a comparison result.

13. The memory system of claim 12, wherein, when the first logical address coincides with the second logical address, the controller writes the write data to the plurality of pages included in the first memory block.

14. The memory system of claim 12, wherein the controller deletes invalidation data stored in the first memory block, in response to an invalidation command.

15. The memory system of claim 14, wherein the controller performs a garbage collection operation by checking valid data stored in the first memory block, reading data except for the deleted invalidation data among the valid data, and writing the read data to a plurality of pages included in a second memory block different from the first memory block among the plurality of memory blocks.

16. The memory system of claim 15, wherein the controller performs an erase operation on the first memory block on which the garbage collection operation is performed.

* * * * *